(12) United States Patent
Min et al.

(10) Patent No.: US 6,979,095 B2
(45) Date of Patent: Dec. 27, 2005

(54) BACKLIGHT UNIT

(75) Inventors: Jee-hong Min, Yongin (KR); Hwan-young Choi, Anyang (KR); Moon-gyu Lee, Suwon (KR); Su-mi Lee, Suwon (KR); Jin-hwan Kim, Suwon (KR); Jin-seung Choi, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 153 days.

(21) Appl. No.: 10/454,548

(22) Filed: Jun. 5, 2003

(65) Prior Publication Data

US 2004/0130880 A1    Jul. 8, 2004

(30) Foreign Application Priority Data

Jan. 7, 2003   (KR) ...................... 10-2003-0000780

(51) Int. Cl.[7] .............................................. F21V 8/00
(52) U.S. Cl. ..................... 362/31; 362/297; 359/599
(58) Field of Search .................. 362/31, 297, 299, 362/339, 346; 359/599, 831

(56) References Cited

U.S. PATENT DOCUMENTS

| 6,139,163 A * | 10/2000 | Satoh et al. ................... 362/31 |
| 6,598,998 B2 * | 7/2003 | West et al. ................. 362/307 |
| 6,799,860 B2 * | 10/2004 | Nakaoka et al. .............. 362/31 |
| 2002/0181222 A1 * | 12/2002 | Boyd et al. |

FOREIGN PATENT DOCUMENTS

| JP | 2002-184225 A | 6/2002 |
| KR | 2001-0008540 A | 2/2001 |

* cited by examiner

*Primary Examiner*—Laura K. Tso
(74) *Attorney, Agent, or Firm*—Sughrue Mion, PLLC

(57) ABSTRACT

A backlight unit includes a light guide panel where a holographic pattern is formed. A point light source emits light to an edge of the light guide panel. A refractive member is provided between the point light source and the light guide panel and reduces an azimuth angle of light incident on the light guide panel. The refractive member includes, from an optical axis of the point light source, a light transmission zone transmitting light as it is, a blaze zone where a blaze pattern having a saw-toothed shape in which one surface near the optical axis and substantially parallel to the optical axis is formed, and a prism zone where a triangular prism pattern is formed. The backlight unit may further include a diffusive member diffusing light emitted from the point light source to be incident on the refractive member.

26 Claims, 10 Drawing Sheets

BACKLIGHT UNIT

BACKGROUND OF THE INVENTION

This application claims the priority of Korean Patent Application No. 2003-780 filed on Jan. 7, 2003, in the Korean Intellectual Property Office, the disclosure of which is incorporated herein in its entirety by reference.

1. Field of the Invention

The present invention relates to a backlight unit, and more particularly, to an edge light backlight unit using a light guide panel (LGP) and a point light source.

2. Description of the Related Art

Typically, flat displays are classified into light emission types and light receiving types. An example of a light receiving type flat display is a liquid crystal display. Since the liquid crystal display does not form an image by emitting light by itself, but forms an image by receiving light from the outside, the image displayed on the liquid crystal display cannot be viewed in a dark place. Thus, a backlight unit for emitting light is installed on a rear surface of the liquid crystal display.

According to the arrangement of a light source, the backlight unit can be classified into a direct light type in which a plurality of lamps installed directly under a liquid crystal display directly emit light to a liquid crystal panel, and an edge light type in which a lamp installed at an edge of a light guide panel emits light and the light is transferred to a liquid crystal panel.

The edge light type may use a linear light source or a point light source. A typical linear light source is a cold cathode fluorescent lamp (CCFL) in which electrodes at both end portions are installed in a tube. As a point light source, there is a light emitting diode (LED). The CCFL can emit a strong white light, exhibits a high brightness and a high homogeneity, and makes a large area design possible. However, it is disadvantageous in that the CCFL is operated by a high frequency AC signal and an operational temperature range is narrow. Compared to the CCFL in brightness and homogeneity, the LED does not perform as well. However, the LED has the advantages of being operated by a DC signal, having a long life span and a wide operational temperature range, and capable of being made thin.

A light guide panel used for an edge light backlight unit converts light input through the edge from a linear light source or a spot light source to a surface light and emits the surface light in a vertical direction. A dispersion pattern or holographic pattern is formed on the light guide panel in a print method or mechanical processing method to convert the incident light to a surface light.

FIG. 1 is a perspective view illustrating a conventional edge light backlight unit using a point light source. FIG. 2 is a sectional view of the edge light backlight unit shown in FIG. 1. Referring to FIG. 1, three LEDs 20 are installed at an edge 11 of the light guide panel 10 as point light sources. A holographic pattern 30 to emit light emitted from the LEDs 20 to a light exhaust surface 12 is formed on the bottom surface of the light guide panel 10.

Each of the LEDs 20 emits light toward the edge 11 of the light guide panel 10. Since the LEDs 20 are point light sources, light is emitted within a range of azimuth angles of ±90° with respect to an optical axis, as shown in FIG. 3. Here, an azimuth angle at which light having an intensity (Imax/2) corresponding half the maximum value (Imax) thereof is referred to as a full width half maximum (FWHM). For an LED, the FWHM is typically about ±45°.

The light emitted from the LEDs 20 is input to the light guide panel 10 through the edge 11 and incident on the holographic pattern 30. The holographic pattern 30 having a diffraction grating converts the incident light to a surface light to be emitted toward the light exhaust surface 12 which is an upper surface of the light guide panel 10. The holographic pattern 30 has a certain directionality so that light can be emitted at the highest efficiency when the light is incident at an angle of about 90° with respect to the holographic pattern 30. Also, when the an incident azimuth angle distribution of light incident on the holographic pattern 30 decreases, uniform brightness can be obtained at the light exhaust surface 12. If the brightness of the light exhaust surface 12 is not uniform, a screen appears smeared. In a narrow range of about 1 cm, a brightness change of about 0.9 is detected as a smear. However, when brightness changes gradually from the central portion to the edge portion of the screen, a smear in brightness is not detected even at a change in brightness of about 0.8. Thus, a degree of uniform brightness of 0.8 or more is needed and, in order to obtain a quality image, a degree of uniform brightness of 0.9 or more is needed.

FIG. 4 is a view showing a distribution of light emission by the conventional backlight unit shown in FIG. 1. The light guide panel 10 is divided into three zones: a near portion 40, a middle portion 50, and a far portion 60, sequentially from the edge 11 where the LEDs 20 are installed. In FIG. 4, the middle portion 50 and the far portion 60 have a large light exhaust distribution compared to the near portion 40.

FIG. 5 is a graph showing brightness at the light exhaust surface 12 by the edge light backlight unit shown in FIG. 1. In the graph, a vertical axis indicates brightness and a horizontal axis indicates a light exhaust angle at the light exhaust surface 12 as an FWHM. Three curves C1, C2, and C3 indicate brightness of the near portion 40, the middle portion 50, and the far portion 60 respectively. Referring to FIG. 5, it can be seen that brightness of the near portion 40 is greater than those of the middle portion 50 and the far portion 60. While the FWHM is 20°/20° at the near portion 40, it is 20°/35° at the middle portion 50 and the far portion 60 which appears wider. In 20°/35°, the angle "20°" and the angle "35°" indicate the FWHMs in directions X and Y, respectively.

The irregular brightness results from a fact that the distribution of an incident azimuth angle of light incident on the holographic pattern 30 at the middle portion 50 and the far portion 60 is greater than that of the near portion 40. That is, light having a variety of incident azimuth angles resulting from multiple reflections as shown in FIG. 2 is incident on the holographic pattern 30 in the middle portion 50 and the far portion 60 located far from the LEDs 20. The irregular brightness becomes severe as the distribution of an incident azimuth angle of light emitted from the LEDs 20 and incident on the light guide panel increases.

SUMMARY OF THE INVENTION

To solve the above and other problems, the present invention provides an edge light backlight unit which can improve uniformity in brightness at a light exhaust surface by decreasing an azimuth angle of light emitted from a point light source to be incident on a light guide panel.

According to an aspect of the present invention, a backlight unit comprises a light guide panel where a holographic pattern is formed, a point light source emitting light to an edge of the light guide panel, and a refractive member provided between the point light source and the light guide panel reducing an azimuth angle of light incident on the light guide panel, the refractive member comprising, from an optical axis of the point light source, a light transmission zone transmitting light with minimum refraction, a blaze zone where a blaze pattern having a saw-toothed shape in which one surface near the optical axis and substantially parallel to the optical axis is formed, and a prism zone where a triangular prism pattern is formed.

According to anther aspect of the present invention, a backlight unit comprises a light guide panel where a holographic pattern is formed, a point light source emitting light to an edge of the light guide panel, a diffusive member diffusing light emitted from the point light source, and a refractive member provided between the diffusive member and the light guide panel and reducing an azimuth angle of light incident on the light guide panel.

The light transmission zone is formed to transmit light having an azimuth angle approximately from a range between 0°–±9° to a range between 0°–±16° in the refractive member.

An angle between an inclined surface of the triangular prism pattern and a line substantially perpendicular to the optical axis is greater than the maximum azimuth angle of light passing through the prism zone.

An angle between an inclined surface of the blaze pattern and a line substantially perpendicular to the optical axis is greater than the maximum azimuth angle of light passing through the blaze zone.

In yet another aspect of the present invention, the diffusive member is integrally formed with the refractive member by forming a concave curved surface on an incident surface of the refractive member.

BRIEF DESCRIPTION OF THE DRAWINGS

The above features of the present invention will become more apparent by describing in detail illustrative, non-limiting embodiments thereof with reference to the attached drawings in which.

DETAILED DESCRIPTION OF THE INVENTION

Figure 6:
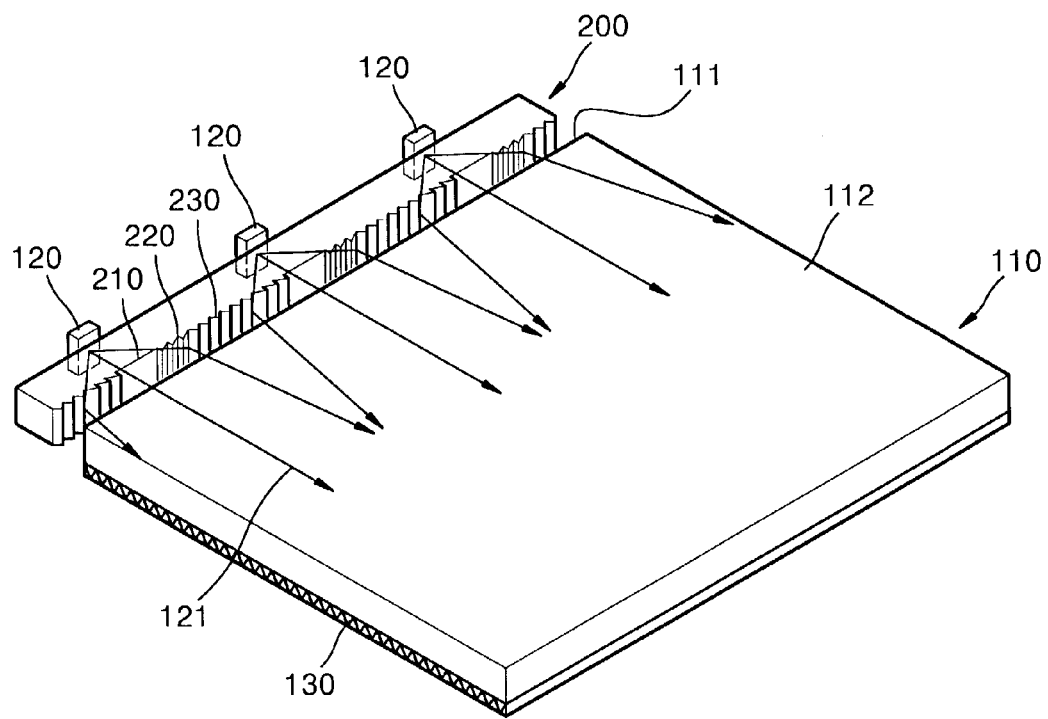
FIG. 6 is a perspective view illustrating a backlight unit according to an exemplary embodiment of the present invention.

Referring to FIG. 6, three LEDs 120 are installed at an edge 111 of a light guide panel 110 as point light sources. A refractive member 200 is installed between the light guide panel 110 and the LEDs 120. For example, a material such as air having a refractive index lower than the refractive member 200 or a part of the light guide panel 110 is provided between the LEDs 120 and the refractive member 200, and between the refractive member 200 and the light guide panel 110.

The light guide panel 110 is manufactured of a material capable of transmitting light. As the light transmitting material, acrylic transparent resin (PMMA) having a refractive index of about 1.49 and a specific gravity of about 1.19 is mainly used. For light weight, an olefin based transparent resin having a specific gravity of about 1.0 is used. The light guide panel 110 is normally about 2–3 mm thick and a wedge type design having a thickness gradually decreasing from an incident portion to a far portion to reduce the weight may be used. The size of the light guide panel 110 is dependent on the size of an image display device (not shown) installed above a light exhaust surface 112, for example, an LCD (liquid crystal display). A holographic pattern 130 is formed at the light guide panel 110. Although not shown in the drawing, a diffusive panel for diffusing light may be installed above the light exhaust surface 112.

The holographic pattern 130 diffracts light input through the edge 111 of the light guide panel 110 to emit the diffracted light to the light exhaust surface 112. In FIG. 6, the holographic pattern 130 is provided on a lower surface of the light guide panel 110. In the holographic pattern 130, diffraction gratings having a period of about 2 μm or less are repeatedly arranged. For example, the holographic pattern 130 can be formed by repeatedly arranging diffraction gratings having a period of about 0.4 μm and a depth of about 0.2 μm. A reflection member (not shown) for reflecting the light passing through the holographic pattern 130 upward can be installed under the holographic pattern 130. The highest efficiency in light emission is available when the light is incident on the holographic pattern 130 at an angle of about 90°. When the azimuth angle distribution of the light incident on the holographic pattern 130 is uniform, brightness at the light exhaust surface 112 becomes uniform.

Figure 3:
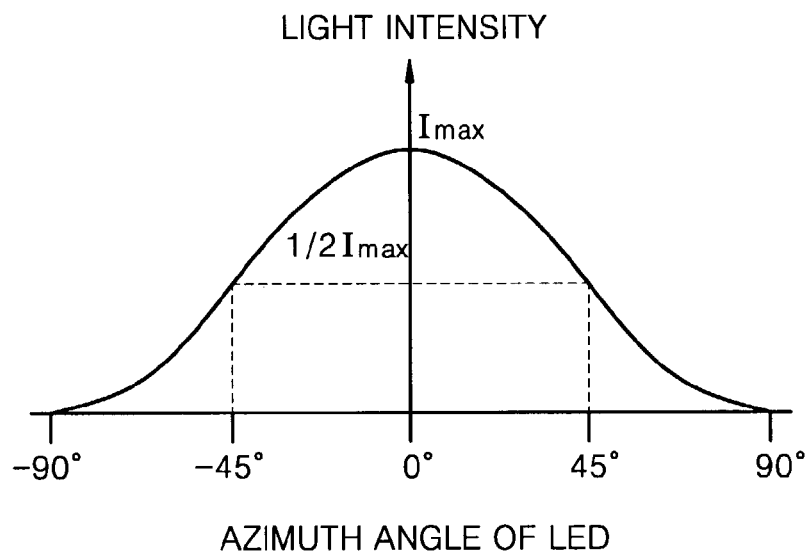
FIG. 3 is a graph showing an azimuth angle of an LED.
Figure 4:
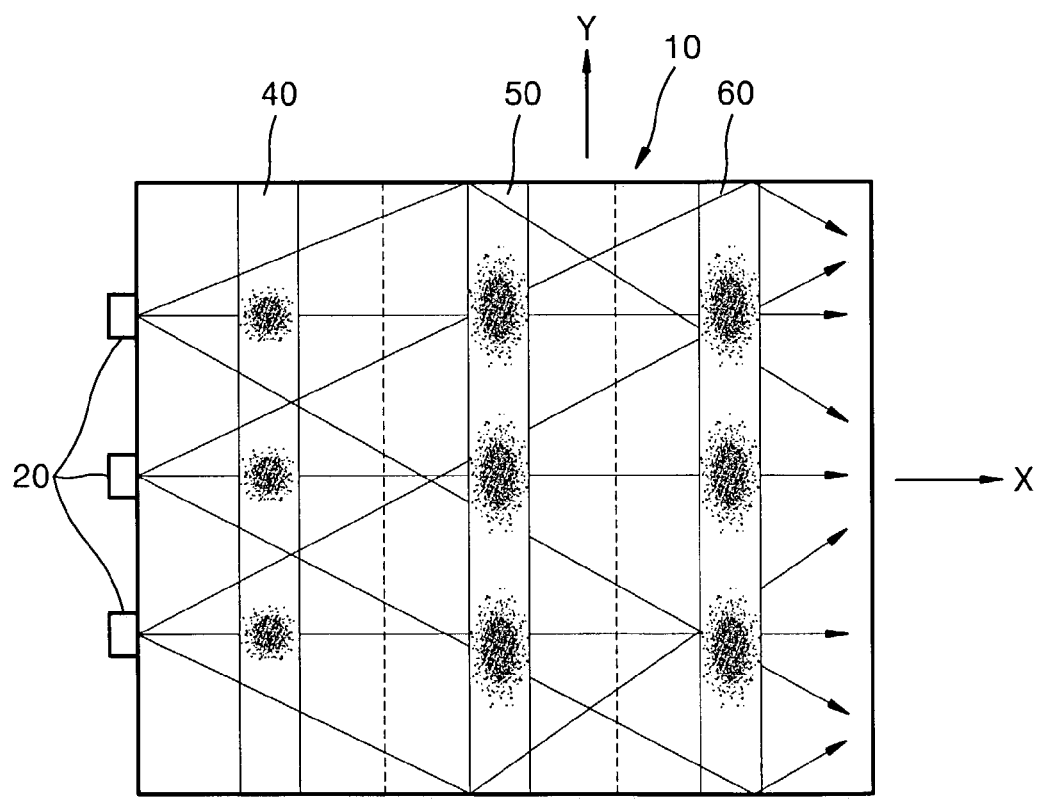
FIG. 4 is a view illustrating a distribution of light exhaust by the conventional backlight unit shown in FIG. 1.
Figure 5:
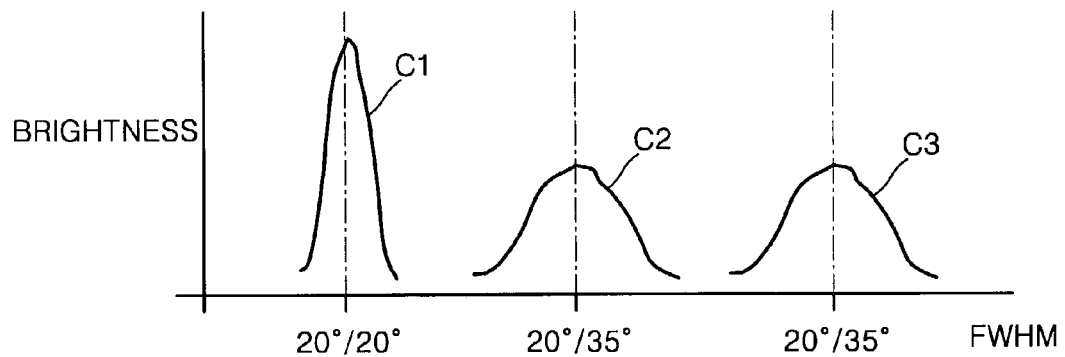
FIG. 5 is a graph showing brightness at the light exhaust surface in the conventional backlight unit shown in FIG. 1.

The LEDs 120, as an example of a point light source, emit light within a range of an azimuth angle of about ±90° with respect to an optical axis as shown in FIG. 3. Here, an azimuth angle at which light having an intensity (Imax/2) corresponding half the maximum value (Imax) thereof is referred to as a full width half maximum (FWHM). For an LED, the FWHM is typically about ±45°. Although the three LEDs 120 are installed at the edge 111 of the light guide panel 110 in an exemplary embodiment, since the number of the LEDs 120 is determined by the size of the light guide panel 110 and the required brightness, more LEDs 120 can be installed. Also, the LEDs 120 can be installed not only at the edge 111 but also at the other edges of the light guide panel 110.

The refractive member 200 reduces an azimuth angle of the light incident on the light guide panel 110 by refracting the light emitted from the LEDs 120 toward the optical axis 121. The refractive member 200 includes a light transmission zone 210 in which light near the optical axis 121 is transmitted with minimum refraction, a blaze zone 220 where a blaze pattern having a saw-toothed shape is formed, and a prism zone 230 where a triangular prism pattern is formed. The refractive member 200 can be made of the same material as that of the light guide panel 110, or a material having a refractive index greater than or less than that of the light guide panel 110 in some cases. The refractive member 200 can be manufactured by machining or injection molding acrylic based transparent resin (PMMA) or olefin based transparent resin.

Figure 7:
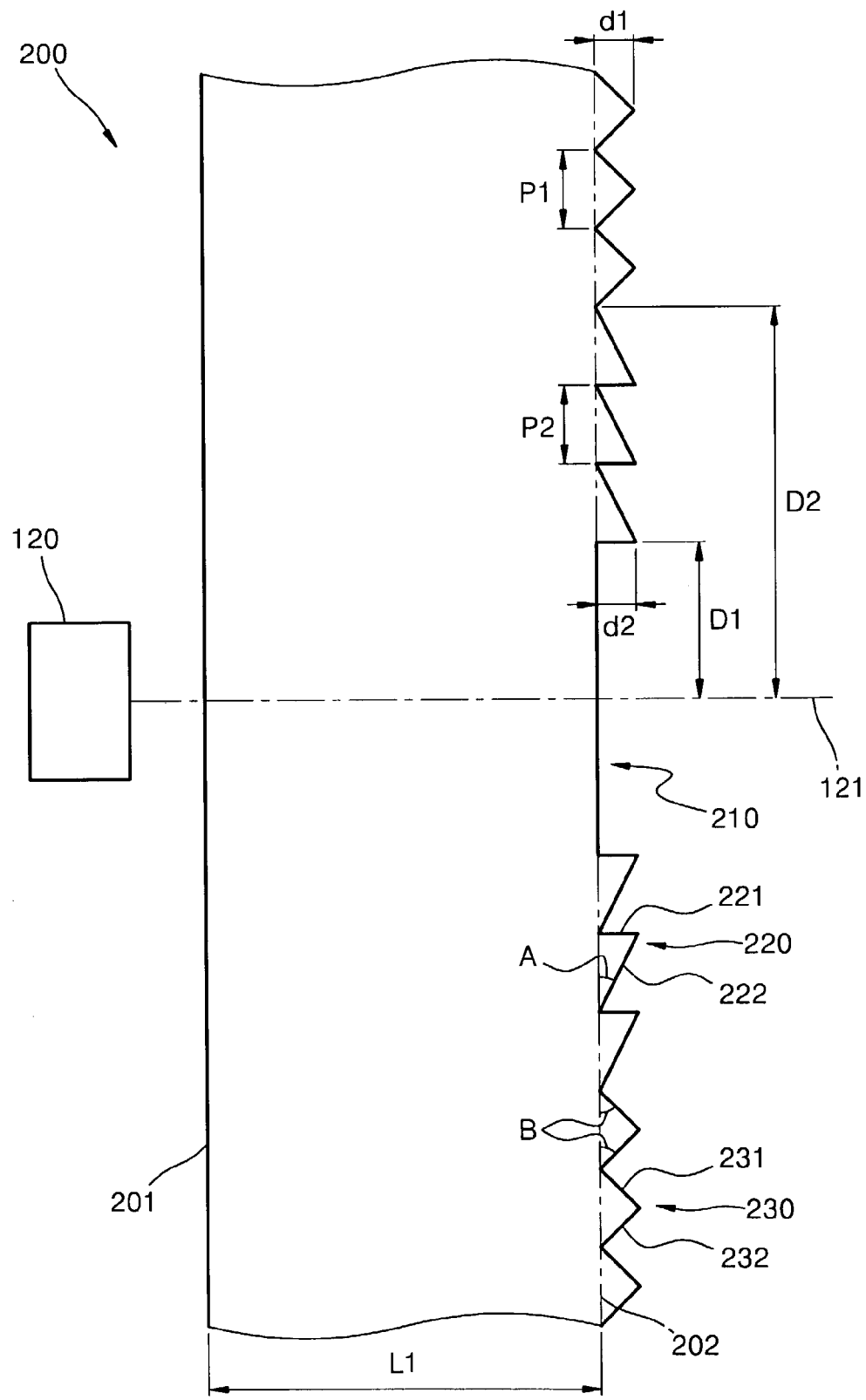
FIG. 7 is a plan view illustrating a refractive member shown in FIG. 6.

FIG. 7 is a plan view illustrating the refractive member shown in FIG. 6. Referring to FIG. 7, the refractive member 200 according to the present exemplary embodiment uses PMMA having a refractive index of about 1.49, and a thickness, that is, a distance L1 between the incident surface 201 and the light exhaust surface 202 of the refractive member 200, is about 5 mm. The LEDs 120 are installed and separated by a small distance from the incident surface 201.

The distance D1 from the optical axis 121 defines the light transmission zone 210, which can be formed by not forming the prism pattern and the blaze pattern on the light exhaust surface 202, as shown in FIG. 7. Although not shown in the drawing, the light transmission zone 210 can be formed by cutting a part of the refractive member 200 by as much as the distance D1 from the optical axis 121.

The blaze zone 220 where light emitted from a single LED is input and light emitted from neighboring LEDs is not input, is an area corresponding to D2–D1. Thus, in the blaze zone 220, a saw-toothed blaze pattern having a first surface 221 substantially parallel to the optical axis 121 and a second surface inclined by a predetermined angle with respect to the optical axis 121 is repeatedly arranged. Also, the first surface 221 must be disposed near the optical axis 121. Although a pitch P2 of the blaze pattern is set to about 50 $\mu$m in the present exemplary embodiment, the pitch is not limited thereto and can be appropriately set by considering the output and the light exhaust distribution at the light exhaust surface 112 of the light guide panel 110.

In the present exemplary embodiment, D2 is set to about 3.6 mm. The LEDs 120 can be installed and separated, for example, by about 0.05 mm, from the incident surface 201 of the refractive member 220. Since the refractive index of PMMA is about 1.49, the light incident on the refractive member 200 has a maximum azimuth angle of about 42°. Since the distance L1 between the incident surface 201 and the exhaust surface 202 is about 5 mm, when D2 is set to about 3.6 mm, light having the maximum azimuth angle of about 36° is incident on the blaze zone 220.

In order for the light passing through the blaze zone 220 to be refracted toward the optical axis 121 so that an azimuth angle of the light is decreased, an angle A between the second surface 222 of the blaze pattern and a line substantially perpendicular to the optical axis 121 is preferably, but not necessarily, greater than the maximum azimuth angle of the light passing through the blaze zone 220, and preferably, but not necessarily, greater than about 36° in the present exemplary embodiment. However, the present invention is not limited thereto. It is preferable, but not necessary, that the angle A is determined in consideration of the total light flux, light flux of a steradian, and FWHM at the light exhaust surface 112 of the light guide panel 110.

The prism zone 230 is defined from D2 to a boundary with a blaze zone of another neighboring LED. The prism zone 230 is affected by another LED adjacent thereto, in which a triangular prism pattern is repeatedly arranged such that inclined surfaces 231 and 232 at either side with respect to the apex become refractive surfaces. Although a pitch P1 of the triangular prism pattern is set to about 50 $\mu$m in the present exemplary embodiment, the present invention is not limited thereto. The pitch P1 of the triangular prism pattern is appropriately set by considering the output and the light exhaust distribution at the light exhaust surface 112 of the light guide panel 110. In order for the light passing through the prism zone 230 to be refracted toward the optical axis 121 so that an azimuth angle of the light is decreased, an angle B between each of the inclined surfaces 231 and 232 of the triangular prism pattern and a line substantially perpendicular to the optical axis 121 is preferably, but not necessarily, greater than the maximum azimuth angle of the light incident on the prism zone 230. However, the present invention is not limited thereto. It is preferable, but not necessary, that the angle B is determined in consideration of the total light flux, light flux of a steradian, and FWHM at the light exhaust surface 112 of the light guide panel 110.

Also, since the blaze zone 220 is an area affected by other neighboring LEDs, D2 is determined in consideration of the total light flux, light flux of a steradian, and FWHM at the light exhaust surface 112 of the light guide panel 110, together with the distance between the LEDs 120 and the refractive index of the refractive member 200. A greater total light flux and a greater light flux of a steradian are preferable, but not necessary, while a smaller FWHM is preferable, but not necessary.

Figure 8:
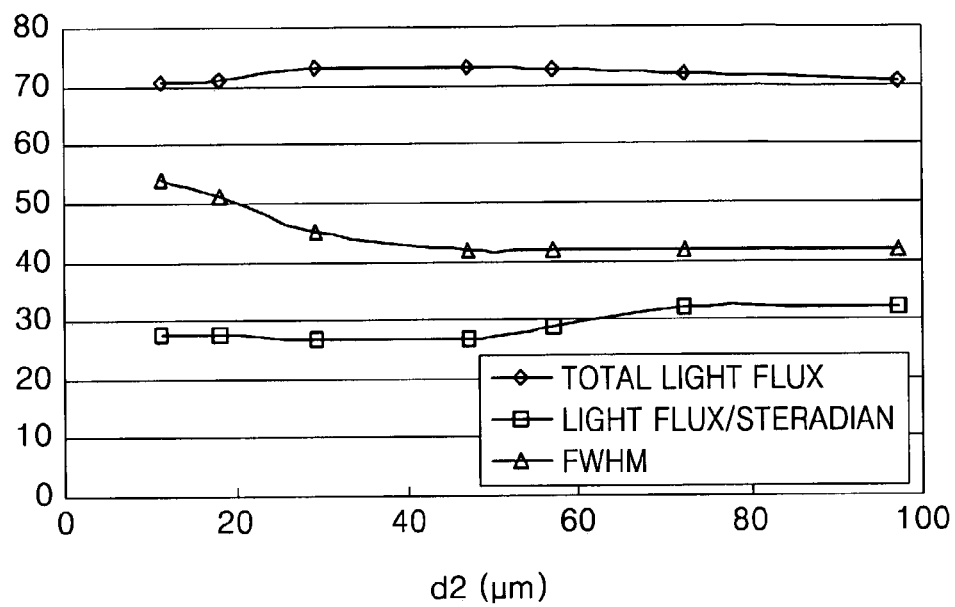
FIG. 8 is a graph showing the relationship between an apex angle of a triangular prism pattern and a light exhaust distribution at a light exhaust surface.

FIG. 8 is a graph showing the relationship between an apex angle of a triangular prism pattern and a light exhaust distribution at a light exhaust surface. The graph of FIG. 8 shows the result of measurement of the total light flux at the light exhaust surface 112, the light flux of a steradian, and FWHM by changing the distance d1 between the base and the apex when the pitch P1 of the triangular prism pattern is about 50 $\mu$m. To improve brightness, a greater light flux and a greater light flux of a steradian are preferable, but not necessary, while a smaller FWHM is preferable, but not necessary.

In FIG. 8, the light flux almost does not change in an area where d1 is from about 20 $\mu$m to about 90 $\mu$m. The FWHM decreases as d1 increases and is at a minimum from about 50 $\mu$m. The light flux of a steradian is at a maximum for d1 greater than about 60 $\mu$m. According to the present experiment, when d1 between the base and the apex is about 60 $\mu$m–100 $\mu$m, an optimal light exhaust distribution can be obtained at the light exhaust surface 112. Accordingly, when the pitch P1 is about 50 $\mu$m, the apex angle is about 28–45° and the angle B between each of the inclined surfaces 231 and 232 and a line substantially perpendicular to the optical axis is about 67.5–76°. The above-described range of the apex angle is an example of optimal values selected through experiments and the scope of the present invention is not limited thereto.

Figure 9:
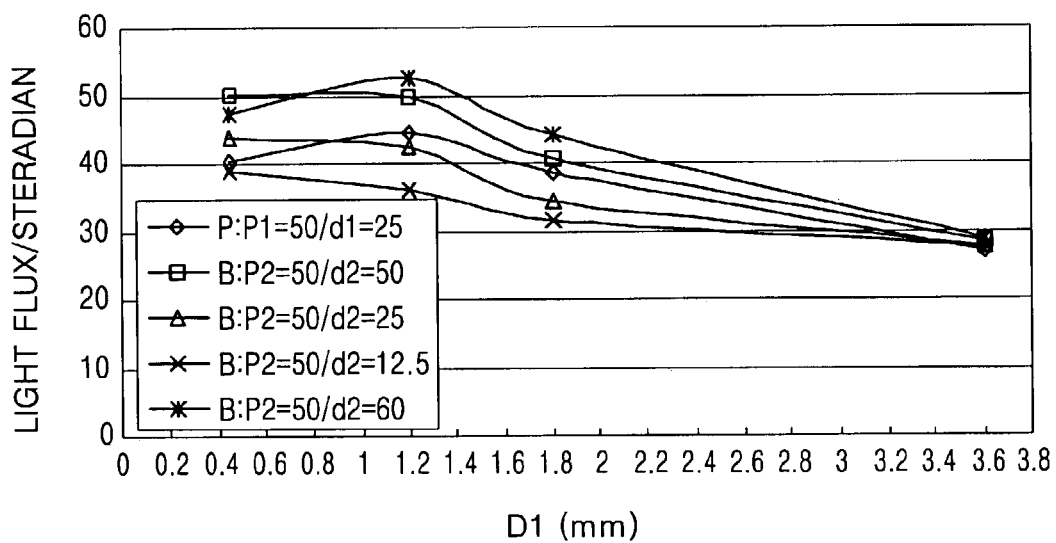
FIG. 9 is a graph showing the relationship between the width of a light transmission zone and an apex angle of a blaze pattern, and light exhaust distribution at a light exhaust surface.

FIG. 9 is a graph showing the relationship between the apex angle of the blaze pattern, the width of the light transmission zone, and the light exhaust distribution at the light exhaust surface 112. The graph of FIG. 9 shows the result of the measurement of the light flux of a steradian obtained by changing the distance d2 between the base and the apex and the width D1 of the light transmission zone 210 when the pitch P2 of the blaze pattern is about 50 μm. P:P1=50/d1=25 indicates a case in which a triangular prism pattern in which the pitch P1 is about 50 μm and the distance d1 between the base and the apex is 25 μm is formed instead of the blaze pattern. B:P2=50/d2=50 indicates a case where a blaze pattern having the pitch P2 of about 50 μm and the distance d2 between the base and the apex of about 50 μm is formed.

Referring to FIG. 9, in the case of B:P2=50/d2=50 and B:P2=50/d2=60, the light flux of a steradian is greater than P:P1=50/d1=25 regardless of the width D1 of the light transmission zone 210. In the case of B:P2=50/d2=25 and B:P2=50/d2=12.5, the light flux of a steradian is less than P:P1=50/d1=25. Preferably, but not necessarily, d2 is determined within a range in which the light flux of a steradian is greater than a case in which a prism pattern is formed instead of a blaze pattern.

Also, since the width D1 of the light transmission zone 220 is preferably, but not necessarily, determined so that the light flux of a steradian becomes maximum, referring to FIG. 9, a width of about 0.8–1.4 mm from the optical axis 121 can be selected. The width D1 recalculated into an angle from the optical axis 121 corresponds to an angle of about 9–16°.

Figure 10:
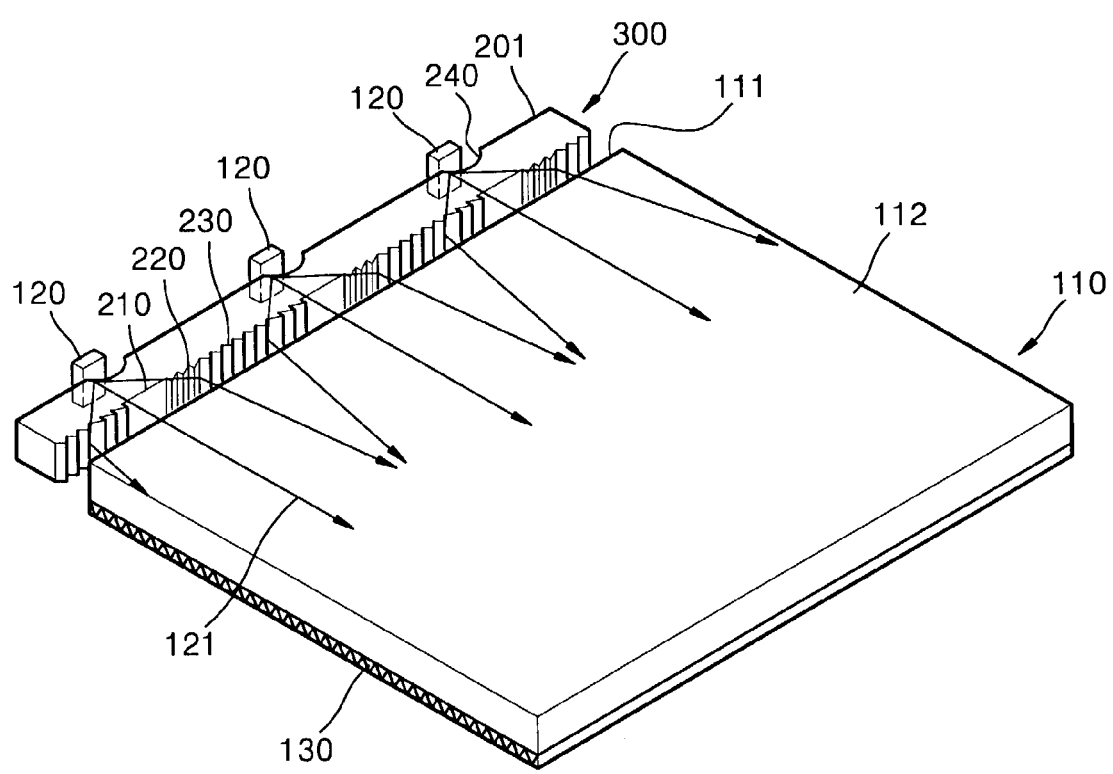
FIG. 10 is a perspective view illustrating a backlight unit according to another exemplary embodiment of the present invention.

FIG. 10 shows a backlight unit according to another exemplary embodiment of the present invention. Referring to the drawing, a concave lens 240 is formed on the incident surface 201 of a refractive member 300. The concave lens 240 is an example of a diffusive member to diffuse light so that an azimuth angle of the light emitted from the LEDs 120 to be incident on the concave lens 240 increases. Although the diffusive member is integrally formed with the refractive member 300 in the present exemplary embodiment, a concave lens may be additionally installed between the LEDs 120 and the refractive member 200 in FIG. 6. However, since a light transmission rate may be lowered if light passes a plurality of propagation media, the concave lens is preferably, but not necessarily, formed integrally with the refractive member 300 as in the present exemplary embodiment. The LEDs 120 are preferably, but not necessarily, disposed between the curved surface of the concave lens 240 and the center of a circle made by the curved surface. The radius of curvature of the concave lens 240 can be appropriately determined by considering the total light flux and the light flux of a steradian at the light exhaust surface 112 of the light guide pattern 110.

In a case of not adopting the concave lens 240, the azimuth angle of light inside the refractive member 200 is about 42° at its maximum when the refractive index of the refractive member 200 is about 1.49. The angle results from a case in which light emitted from the LEDs 120 and having an azimuth angle of about 90° is incident on the refractive member. However, since the refractive member 200 and the LEDs 120 are slightly separated from each other, the maximum azimuth angle of the light inside the refractive member 200 is actually less than about 42°. In a case of adopting the concave lens 240, since light is diffused when incident on the refractive member 300, the azimuth angle of the light inside the refractive member 300 can be greater than about 42° according to the curvature of the concave lens 240 and the installation position of the LEDs 120. As the light passes through the light transmission zone 210, the blaze zone 220, and the prism zone 230 formed on the light exhaust surface 202 of the refractive member 300, the azimuth angle of the light decreases and the light is incident on the light guide panel 110.

Figure 11:
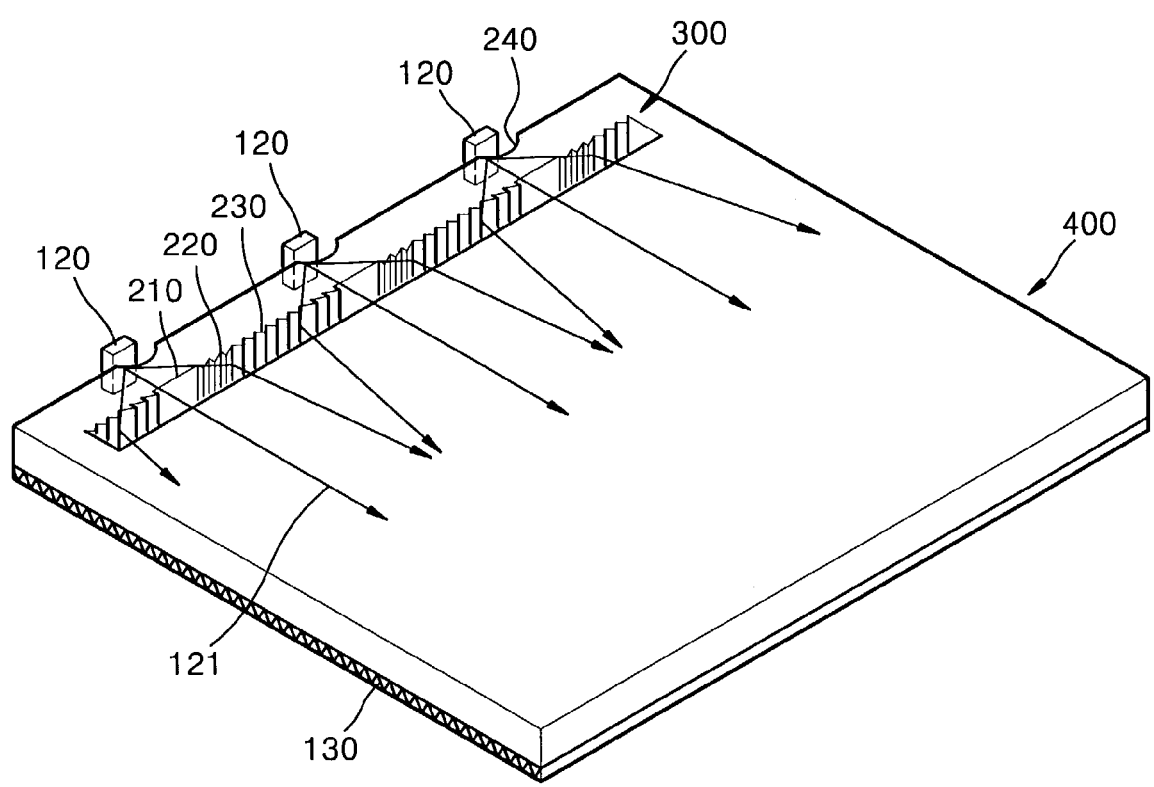
FIG. 11 is a perspective view illustrating a backlight unit according to yet another exemplary embodiment of the present invention.

In the above exemplary embodiments, the refractive member 200 or 300 is separately manufactured and installed between the LEDs 120 and the light guide panel 110. However, the refractive member 200 or 300 can be manufactured integrally with the light guide panel 110. FIG. 11 shows a backlight unit according to yet another exemplary embodiment of the present invention. In FIG. 11, a light guide panel 400 integrally manufactured with the refractive member is shown.

The operation and effects of backlight units according to the above-described exemplary embodiments of the present invention will now be described.

The light emitted from the LEDs 120 is incident on the refractive member 200 or 300 via the incident surface 201. The azimuth angle of the light inside the refractive member 200 is about ±42° at its maximum when the refractive index of the refractive member 200 is 1.49. As shown in FIG. 10, when the concave lens 240 is adopted, since the light is diffused as it is incident on the refractive member 300, the azimuth angle of the light inside the refractive member 300 can be greater than about 42°.

Of the above light, light having an azimuth angle approximately from a range between 0°–±9° to a range between 0°–±16° passes through the light transmission zone 210 and is incident on the light guide panel 110. When the light passes through the light exhaust surface 202, the azimuth angle of the light increases due to a difference in the refractive index between the refractive member 200 or 300 and air. However, when the light is incident on the light guide panel 110, the azimuth angle decreases by the same amount. Thus, the azimuth angle of the light passing through the light transmission zone 210 in the light guide panel 110 is the same as that of the light in the refractive member 200 or 300.

In the blaze zone 220, light emitted from neighboring LEDs are not input and the first surface 221 of the blaze zone 220 is substantially parallel to the optical axis 121 and the second surface 222 thereof is inclined by a predetermined angle. Thus, the second surface 222 only acts as a refractive surface. In the prism zone 230, the light emitted from other LEDs are input and both of the inclined surfaces 231 and 232 act as refractive surfaces.

The azimuth angle of the light passing through the blaze zone 220 and the prism zone 230 decreases. When the light travels from a medium exhibiting a relatively higher refractive index to a medium exhibiting a relatively lower refractive index, an exhaust angle is greater than an incident angle. Thus, the light passing through the second surface 222 of the blaze pattern and the inclined surfaces 231 and 232 of the prism pattern is refracted toward the light axis 121 so that the azimuth angle of the light decreases. The light is incident on the light guide panel 110. At this time, the light travels from a medium exhibiting a relatively lower refractive index to a medium exhibiting a relatively higher refractive index. Since the edge 111 of the light guide panel 110 is substantially perpendicular to the optical axis 121, the azimuth of the light decreases again.

When the azimuth angle of the light incident on the light guide panel 110 decreases, since the light is incident on the holographic pattern 130 at an angle close to 90°, the holographic pattern 130 can emit light at a high efficiency. Also, since the incident azimuth angle distribution of the light incident on the holographic pattern 130 is uniform, the exhaust azimuth angle distribution of the light exhausted from the light exhaust surface 112 is uniform. Thus, the uniformity of brightness at the light exhaust surface 112 is improved.

Figure 1:
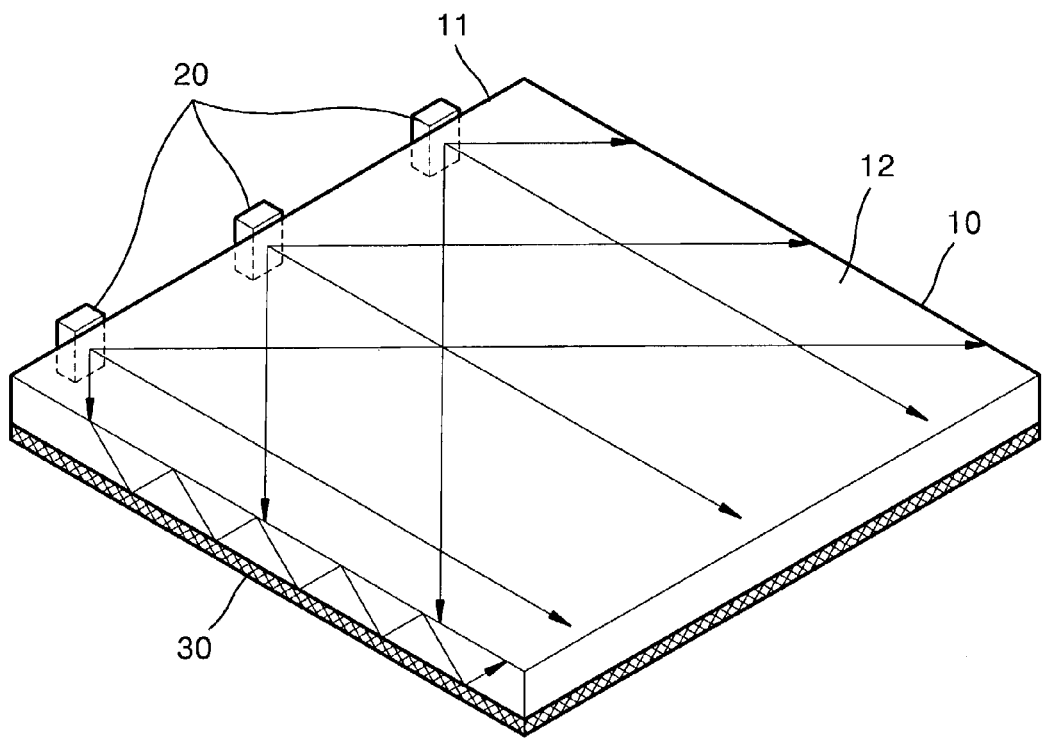
FIG. 1 is a proposed perspective view illustrating a conventional edge light backlight unit using a point light source.
Figure 2:
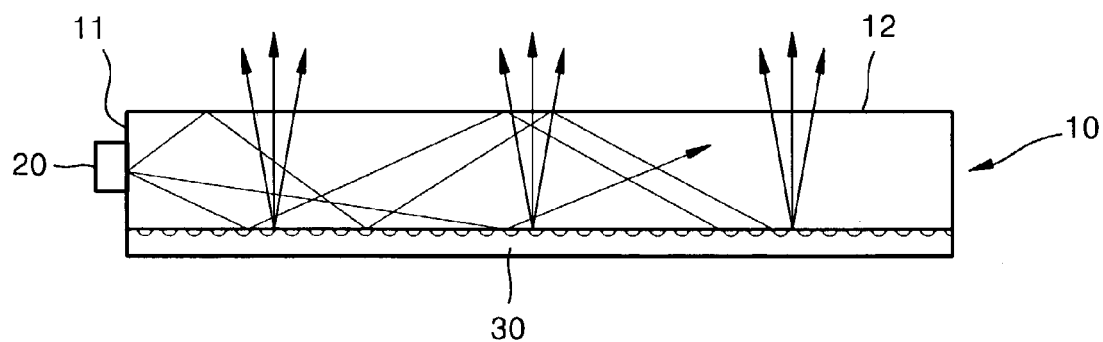
FIG. 2 is a sectional view illustrating the edge light backlight unit shown in FIG. 1.
Figure 12:
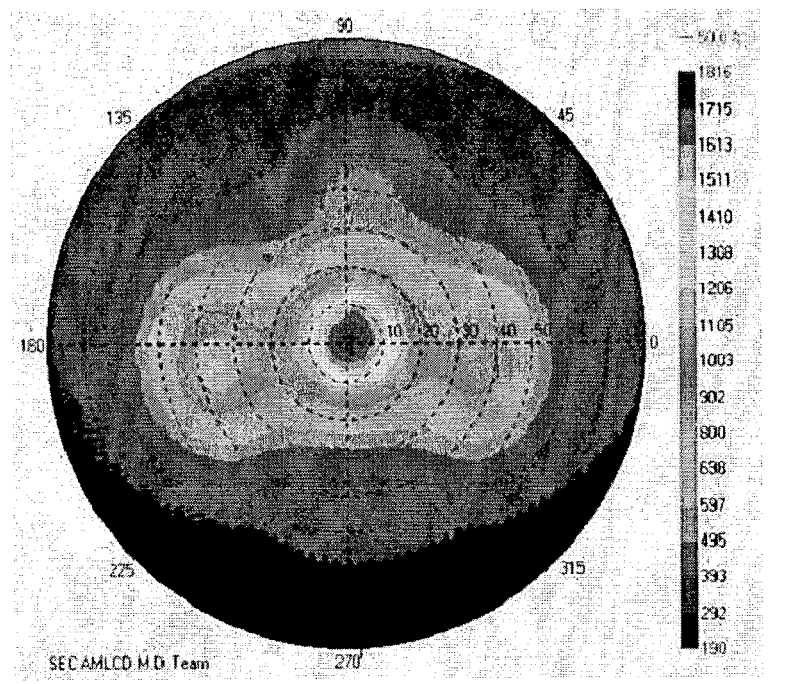
FIGS. 12 and 13 are graphs showing the brightness measured at a near portion and a far portion, respectively, of the conventional backlight unit shown in FIG. 1.
Figure 13:
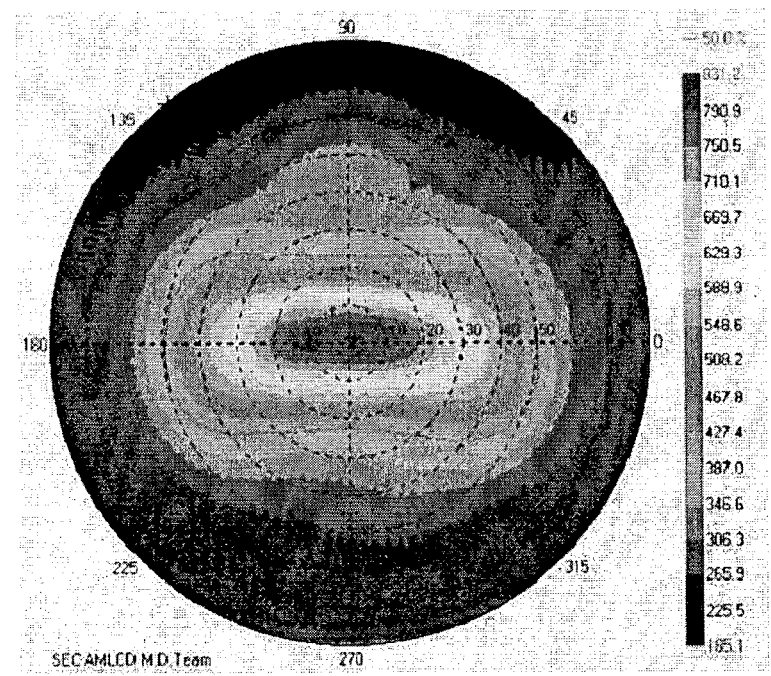
Figure 14:
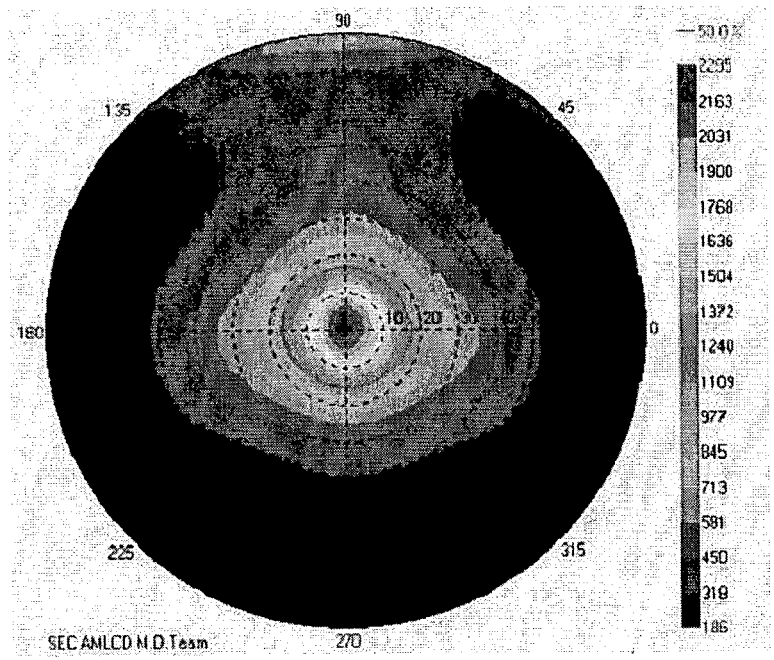
FIGS. 14 and 15 are graphs showing the brightness measured at a near portion and a far portion, respectively, of the backlight units according to the exemplary embodiment of the present invention shown in FIG. 6.
Figure 15:
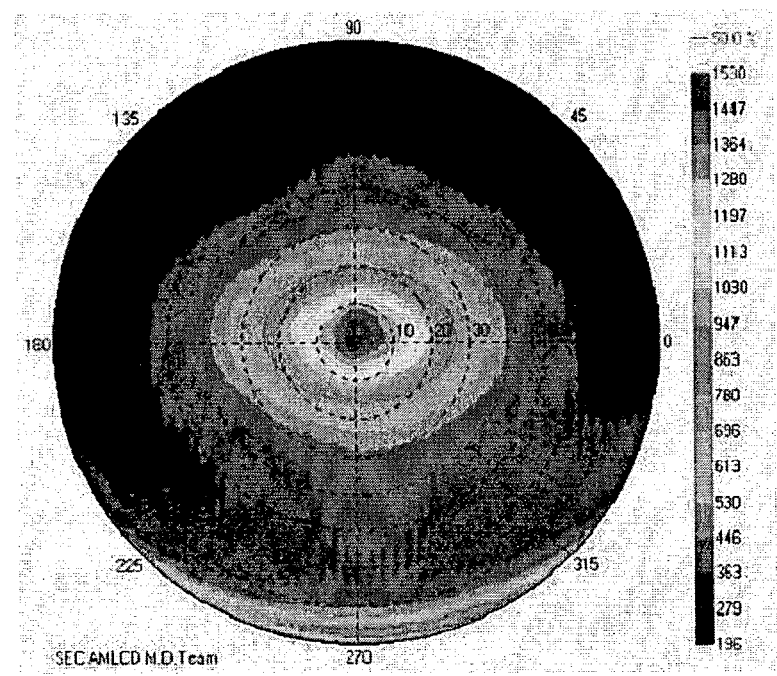

FIGS. 12 and 13 are graphs showing the brightness measured at the near portion and the far portion, respectively, of the conventional backlight unit shown in FIG. 1. FIGS. 14 and 15 are graphs showing the brightness measured at the near portion and the far portion, respectively, of the backlight units according to the exemplary embodiments of the present invention shown in FIG. 6. The results shown in the graphs of FIGS. 12 through 15 are obtained by installing a diffusive panel (not shown) on the light guide panel and measuring the brightness of light passing the diffusive panel.

Referring to FIGS. 12 and 13, the brightness distribution of the far portion appears wider than that of the near portion. However, referring to FIGS. 14 and 15, it can be seen that a difference in the brightness distribution between the near portion and the far portion is remarkably reduced. This is because the azimuth angle of the light incident on the light guide panel 110 is reduced by using the refractive member 200 so that the incident azimuth angle distribution of the light incident on the holographic pattern 130 is almost identical at the near portion and the far portion.

Figure 16:
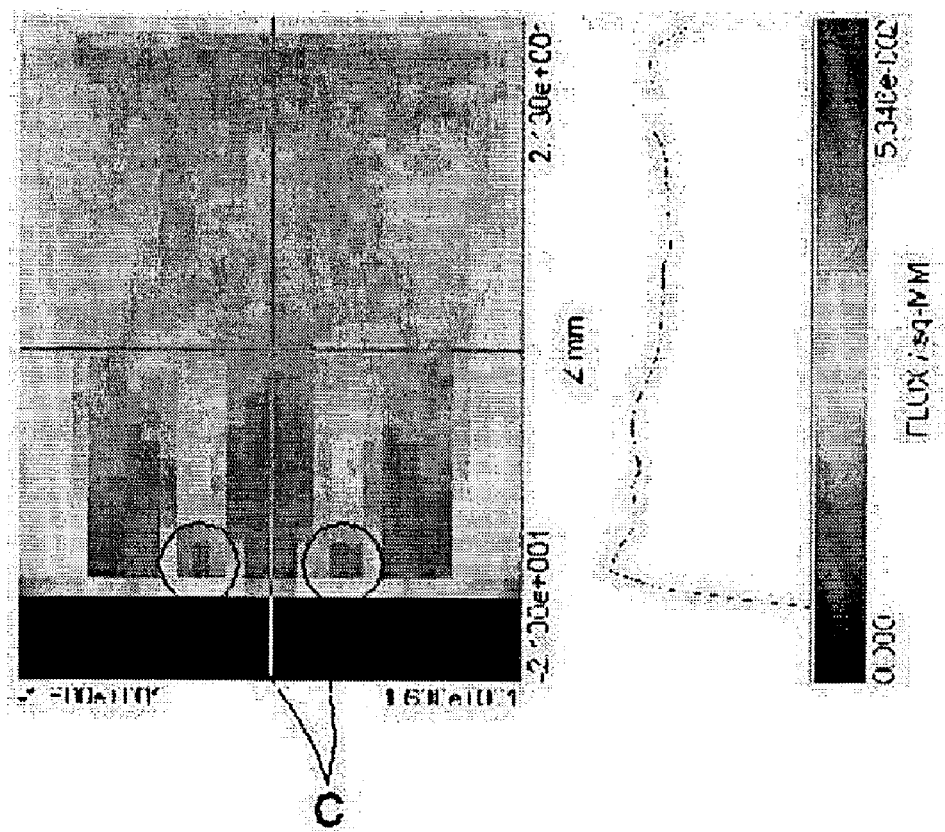
FIG. 16 is a graph showing the light flux at a light guide panel in the backlight unit shown in FIG. 10.

A dark zone may be generated in a middle area between the LEDs 120. FIG. 16 is a graph showing the light flux in the light guide panel when the diffusive member is adopted as in the exemplary embodiment shown in FIG. 10. Referring to FIG. 16, since the light is diffused by the concave lens 240 and the azimuth angle of the light in the refractive member 300 increases, a bright area as indicated by reference character C appears between the LEDs 120. Thus, by diffusing the light incident on the refractive member 300 using the diffusive member such as the concave lens 240, the generation of the dark zone can be prevented or minimized.

As described above, according to the backlight unit of the present invention, the following effects can be obtained.

First, by decreasing the incident azimuth angle distribution of the light incident on the light guide panel, an efficiency of the holographic pattern to emit light to the light exhaust surface can be improved.

Second, since the distribution of intensity of light emitted to the light exhaust surface is uniform, uniformity in brightness of the light exhaust surface is improved.

Third, by adopting the diffusive member, a dark zone between point light sources can be removed or minimized.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A backlight unit comprising:
a light guide panel where a holographic pattern is formed;
a point light source emitting light to an edge of the light guide panel; and
a refractive member provided between the point light source and the light guide panel and reducing an azimuth angle of light incident on the light guide panel, the refractive member comprising, from an optical axis of the point light source, a light transmission zone transmitting light as it is, a blaze zone where a blaze pattern having a saw-toothed shape in which one surface near the optical axis is parallel to the optical axis is formed, and a prism zone where a triangular prism pattern is formed.

2. The backlight unit as claimed in claim 1, wherein the light transmission zone is formed to transmit light having an azimuth angle substantially from a range between 0°–±9° to a range between 0°–±16° in the refractive member.

3. The backlight unit as claimed in claim 1, wherein an angle between an inclined surface of the triangular prism pattern and a line perpendicular to the optical axis is greater than the maximum azimuth angle of light passing through the prism zone.

4. The backlight unit as claimed in claim 1, wherein an apex angle of the triangular prism pattern is at an angle of substantially 28°–45°.

5. The backlight unit as claimed in claim 1, wherein a pitch of the triangular prism pattern of the prism zone is substantially 50 $\mu$m.

6. The backlight unit as claimed in claim 1, wherein an angle between an inclined surface of the blaze pattern and a line perpendicular to the optical axis is greater than the maximum azimuth angle of light passing through the blaze zone.

7. The backlight unit as claimed in claim 1, wherein a pitch of the blaze pattern is substantially 50 $\mu$m.

8. The backlight unit as claimed in claim 1, wherein the refractive member is integrally formed with the light guide panel.

9. The backlight unit as claimed in claim 1, further comprising a diffusive member diffusing light emitted from the point light source to be incident on the refractive member.

10. The backlight unit as claimed in claim 9, wherein the diffusive member is integrally formed with the refractive member by forming a concave curved surface on an incident surface of the refractive member.

11. A backlight unit comprising:
a light guide panel where a holographic pattern is formed;
a point light source emitting light to an edge of the light guide panel;
a diffusive member diffusing light emitted from the point light source; and
a refractive member provided between the diffusive member and the light guide panel and reducing an azimuth angle of light incident on the light guide panel.

12. The backlight unit as claimed in claim 11, wherein the refractive member comprises, from an optical axis of the point light source, a light transmission zone transmitting light as it is, a blaze zone where a blaze pattern having a saw-toothed shape in which one surface near the optical axis is parallel to the optical axis is formed, and a prism zone where a triangular prism pattern is formed.

13. The backlight unit as claimed in claim 12, wherein the light transmission zone is formed to transmit light having an azimuth angle substantially from a range between 0°–±9° to a range between 0°–±16° in the refractive member.

14. The backlight unit as claimed in claim 12, wherein an angle between an inclined surface of the triangular prism pattern and a line perpendicular to the optical axis is greater than the maximum azimuth angle of light passing through the prism zone.

15. The backlight unit as claimed in claim 12, wherein an apex angle of the triangular prism pattern is at an angle of substantially 28°–45°.

16. The backlight unit as claimed in claim 12, wherein a pitch of the triangular prism pattern of the prism zone is substantially 50 $\mu$m.

17. The backlight unit as claimed in claim 12, wherein an angle between an inclined surface of the blaze pattern and a line perpendicular to the optical axis is greater than the maximum azimuth angle of light passing through the blaze zone.

18. The backlight unit as claimed in claim 12, wherein a pitch of the blaze pattern is substantially 50 μm.

19. The backlight unit as claimed in claim 12, wherein the refractive member is integrally formed with the light guide panel.

20. The backlight unit as claimed in claim 11, wherein the diffusive member is integrally formed with the refractive member by forming a concave curved surface on an incident surface of the refractive member.

21. The backlight unit as claimed in claim 1, wherein the point light source, the diffusive member, and the refractive member are substantially disposed along a direction of an optical axis of the point light source.

22. A backlight unit comprising:
a light guide panel;
a point light source emitting light to an edge of the light guide panel; and
a refractive member provided between the point light source and the light guide panel, the refractive member comprising a light transmission zone transmitting light and a zone having a saw-toothed shape in which one surface near the optical axis and substantially parallel to an optical axis is formed.

23. The backlight unit as claimed in claim 22, wherein the refractive member further comprises a prism zone where a triangular prism pattern is formed.

24. The backlight unit as claimed in claim 23, wherein the optical axis is the optical axis of the point light source.

25. The backlight unit as claimed in claim 24, wherein the light transmission zone, the zone having the saw-toothed shape, and the prism zone are disposed in a direction along the optical axis.

26. A backlight unit comprising:
a light guide panel;
a point light source emitting light to an edge of the light guide panel; and
means for refracting light disposed between the point light source and the light guide panel, the means for refracting light refracting the emitted light toward an optical axis of the point light source.

\* \* \* \* \*